Sept. 16, 1958  LE ROY B. WARNER  2,851,815
FISH LURE
Filed Feb. 20, 1956

INVENTOR.
Leroy B. Warner.
BY Victor J. Evans & Co.
ATTORNEYS

United States Patent Office 2,851,815
Patented Sept. 16, 1958

2,851,815
FISH LURE

Le Roy B. Warner, Winston-Salem, N. C.

Application February 20, 1956, Serial No. 566,480

3 Claims. (Cl. 43—42.28)

This invention relates to fish lures of the type having a lateral swinging or wiggling and swimming action instead of wobbling or darting as it is drawn through the water, and in particular a lure having spaced flat plates connected, at one end, with an arcuate section and having an eye extended upwardly and having a hook and a tail thereon on the end of the lure in which the flat sections are connected with an arcuate portion and a line receiving eye on the opposite end whereby with the flat plate horizontally disposed and converging toward the forward end the lure swings from side to side with a wiggling or swimming action as it is drawn through the water thereby imitating the movement of a small fish.

The purpose of this invention is to provide an improved fish lure in which the lure assumes a wiggling and swimming action instead of a wobbling or darting action as it is drawn through the water.

Fish lures have been provided in various designs and various types of articles have been used in combination therewith, however, numerous efforts have been made to provide a lure that imitates the wiggling or swimming action of a fish as it passes through the water and such actions are not obtained by conventional lures. With this thought in mind this invention contemplates a lure having diverging flat strips of material, open at the forward end and connected with an arcuate section at the trailing end and in which eyes are provided on ends of a strand of wire with the wire extended through openings in an upper section of the lure with an eye at one end aligned with the body of the lure and adapted to receive the end of a fishing line and an eye at the opposite end extended upwardly above the upper surface of the lure and positioned to receive a fish hook with a buck tail or feather substantially covering the hook.

The object of this invention is, therefore, to provide means for improving the design of a fish lure whereby instead of wobbling and darting upwardly and downwardly the lure swings horizontally with a wiggling and swimming action to imitate the movement of a minnow or fish in the water.

Another object of the invention is to provide an improved fish lure wherein an eye for attaching a hook with an enclosing tail is offset upwardly in relation to a line attaching eye whereby the lure assumes an inclined position as it is drawn through the water.

A further object of the invention is to provide an improved fishing lure having a body including diverging flat plates connected with an arcuate section and wherein eyes are provided at the leading and trailing ends in which the lure is of a simple and economical construction.

With these and other objects and advantages in view the invention embodies a flat plate bent substantially midway of its length to form an arcuate section connecting upper and lower parts of the plate, eyes provided at leading and trailing ends of the body and a tail connected to the eye at the trailing end of the body and having a fishing hook incorporated therein.

Other features and advantages of the invention will appear from the following description taken in connection with the drawing, wherein.

Figure 1:
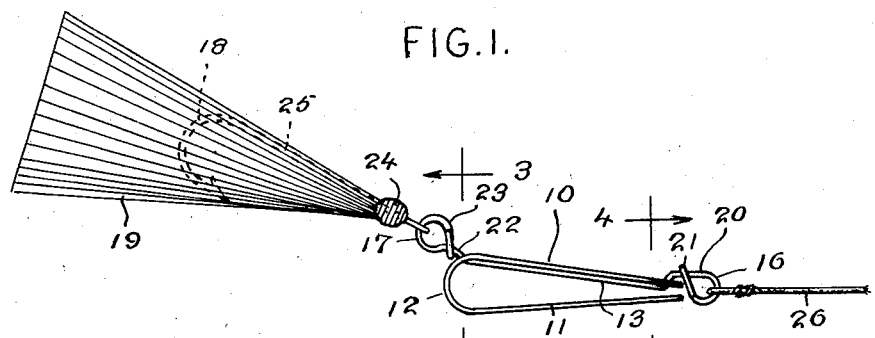
Figure 1 is a side elevational view of the improved fish lure with the parts shown in position in which the lure is used.

Referring now to the drawings wherein like reference characters denote corresponding parts the improved fishing lure of this invention includes a strip of material or body having an upper section 10, a lower section 11, an arcuate section 12 connecting the sections 10 and 11 at the trailing end of the lure, a wire 13 extended through openings 14 and 15 in the upper section 10 of the body and having an eye 16 extended from the end at the leading end of the body and an eye 17 carried by the trailing end of the body, the eye 17 providing means for attaching a hook 18 and a flexible tail 19 to the end 12 of the lure.

The end of the wire 13 at the leading end of the lure is wrapped around the section 20 providing the base of the eye 16 forming a hook-like loop 21 and the end of the wire at the trailing end of the body is secured over an offset section 22 of the wire to form a hook-like loop 23 that closes the eye 17.

The hairs or pieces of material forming the tail 19 are mounted in a bead 24 that is secured at the end of the shank 25 of the hook 18 whereby the hairs, or the like of the tail protect the hook eliminating the possibility of seaweed, leaves and the like accumulating on the hook.

Figure 4:
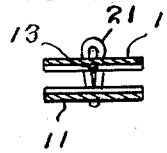
Figure 4 is a cross section through the intermediate part of the lure taken on line 4—4 of Fig. 1, also with the parts shown on an enlarged scale, illustrating the open end of the lure.

As illustrated in Fig. 4 the sections 10 and 11, which are formed of a flat strip of material, are in spaced relation and the section 11 provides a flat horizontally disposed portion that is adapted to ride over the water and which, by the influence of the tail 19 assumes a swimming or wiggling action substantially imitating the movement of a minnow in the water.

Operation

With the parts designed and formed as illustrated and described the force applied to a line 26 causes the lure to travel at a fixed elevation as it passes through the water and, being influenced by the flexible tail 19, the trailing end of the lure is drawn downwardly with the section 11 in an inclined position.

With the section 11 in an inclined position and with the tail 19 extended outwardly substantially in alignment with the fishing line 26 the action of the device resembles the wiggling of a minnow providing a fish lure substantially with a natural movement.

The improved fishing lure may be provided in different sizes and may be colored and used as desired.

Figure 5:
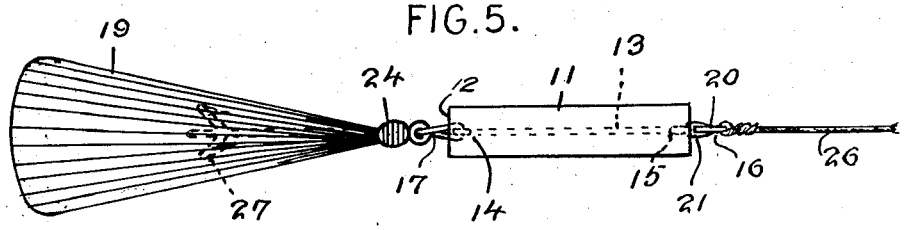
Figure 5 is a plan view looking upwardly toward the under surface of the lure.

The lure may be provided with a single hook, as shown in Fig. 1 or with triple, double, or a plurailty of hooks, such as a gang hook as shown in Fig. 5 and wherein the hook is indicated by the numeral 27.

Figure 6:
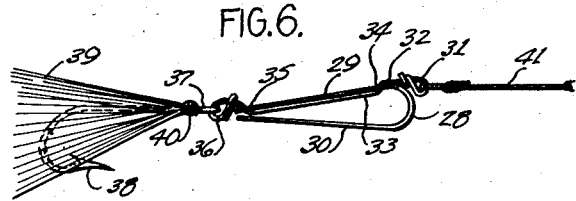
Figure 6 is a side elevational view similar to that shown in Fig. 1 illustrating a modification wherein the position of the lure is reversed, the fishing line being connected to the round end of the lure and the hook and tail being attached to the opposite end.

In the design illustrated in Fig. 6 the strap forming the lure is bent at a point midway of the end providing an arcuate section 28 with end sections 29 and 30 and a line attaching eye 31 is provided on an end 32 of a wire 33 extending through an opening 34 in the section 29.

Figure 2:
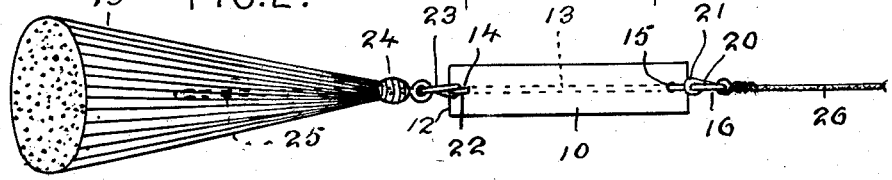
Figure 2 is a plan view of the lure also with the parts as shown in Fig. 1.
Figure 3:
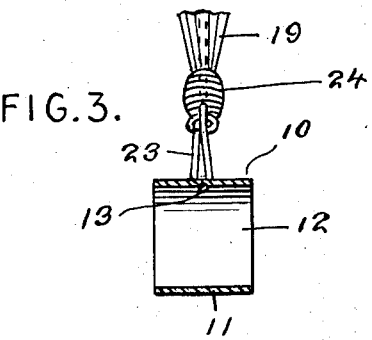
Figure 3 is a cross section through the lure taken on line 3—3 of Fig. 1 showing the eye extended upwardly from the body of the lure and with the parts on an enlarged scale.

The opposite end of the wire extends through an opening 35, also in the section 29 providing a loop 36 which is attached to an eye 37 in the shank of a hook 38. The hook 38 is positioned in a flexible tail 39 extended from a bead 40, similar to the tail 19 shown in Figs. 1 and 2. The device shown in Fig. 6 is used with a fishing line 41, similar to the line 26 attached to the eye 31 at the leading end of the lure.

It will be understood that modifications, within the scope of the appended claims, may be made in the design and arrangement of the parts without departing from the spirit of the invention.

What is claimed is:

1. A fish lure comprising a body having vertically spaced upper and lower plates connected at one end with an arcuate section, said plates converging toward each other from the said one end of said body to the opposite end thereof, eyes extended from leading and trailing ends of the upper plate and the eye at the trailing end being offset upwardly in relation to said upper plate, said eyes being carried on the ends of a wire and said wire being extended through openings in the ends of the upper plate of the body.

2. A fish lure comprising a body having vertically spaced upper and lower plates connected at one end with an arcuate section, said plates converging toward each other from the said one end of said body to the opposite end thereof, said upper section having openings therein spaced from the ends thereof, a wire extending longitudinally of the upper section with the ends thereof extended through the openings in the upper sections, eyes extended from the ends of said wire and positioned at the leading and trailing ends of the upper plate, the eye at the trailing end being offset upwardly in relation to said upper plate, a fishing hook extended from the offset eye on the trailing end of the body, and a tail also extended from the eye on the trailing end of the body and in which the hook is embedded.

3. A U-shaped fishing lure including vertically spaced flat strips of material, connected at one end of the lure with an arcuate section and having openings in and spaced from the ends of the upper section, and a wire extended longitudinally of the upper section, positioned with the ends thereof extended through the openings in the upper section, and having eyes on the ends extended through the openings of the upper section, said plates converging from the end of the body connected by the arcuate section to the leading end.

References Cited in the file of this patent

UNITED STATES PATENTS

| | | |
|---|---|---|
| 2,375,290 | Docteur | May 8, 1945 |
| 2,514,938 | Craig | July 11, 1950 |
| 2,719,378 | Salm | Oct. 4, 1955 |
| 2,756,533 | Keith | July 31, 1956 |